(12) United States Patent
Ferrand et al.

(10) Patent No.: US 11,181,330 B2
(45) Date of Patent: Nov. 23, 2021

(54) HEAT EXCHANGER (71) Applicant: Mahle International GmbH, Stuttgart (DE)

(72) Inventors: Nicolas Ferrand, Stuttgart (DE); Jens Richter, Grossbottwar (DE)

(73) Assignee: Mahle International GmbH

( * ) Notice: Subject to any disclaimer, the term of this patent is extended or adjusted under 35 U.S.C. 154(b) by 74 days.

(21) Appl. No.: 16/584,916

(22) Filed: Sep. 26, 2019

(65) Prior Publication Data
US 2020/0103184 A1 Apr. 2, 2020

(30) Foreign Application Priority Data

Sep. 27, 2018 (DE) .......................... 102018216659.5

(51) Int. Cl.
| | |
|---|---|
| *F01P 3/00* | (2006.01) |
| *F28F 9/02* | (2006.01) |
| *F28D 9/00* | (2006.01) |
| *F28D 7/16* | (2006.01) |
| *F28D 21/00* | (2006.01) |

(52) U.S. Cl.
CPC .......... *F28F 9/0226* (2013.01); *F28D 7/1653* (2013.01); *F28D 9/0068* (2013.01); *F28D 2021/0082* (2013.01)

(58) Field of Classification Search
CPC .... F28F 9/0226; F28D 7/1653; F28D 9/0068; F28D 2021/0082
USPC ........................................................ 165/51
See application file for complete search history.

(56) References Cited

U.S. PATENT DOCUMENTS

| | | |
|---|---|---|
| 10,240,872 B2 | 3/2019 | Ferrand et al. |
| 2011/0088886 A1 | 4/2011 | Kalbacher et al. |
| 2013/0192803 A1* | 8/2013 | Garret .................. F28F 9/0226 |
| | | 165/151 |
| 2013/0284409 A1* | 10/2013 | Odillard ................ F28F 13/12 |
| | | 165/109.1 |

(Continued)

FOREIGN PATENT DOCUMENTS

| | | |
|---|---|---|
| DE | 102009049483 A1 | 4/2011 |
| DE | 102012206106 A1 | 10/2013 |

(Continued)

OTHER PUBLICATIONS

English abstract for EP-1912035.

*Primary Examiner* — Davis D Hwu
(74) *Attorney, Agent, or Firm* — Fishman Stewart PLLC (57) ABSTRACT

The present disclosure relates to a heat exchanger, for example an indirect charge air cooler for an internal combustion engine. The heat exchanger includes a heat exchanger block including a first channel system for a first fluid and a second channel system for a second fluid that is fluidically separate from the first channel system. Two opposite side parts and two opposite end parts are structured and arranged to fluidically delimit the second channel system. At least one frame part is connected with a respective edge of the two side parts and of the two end parts. An air inlet box is connected to the at least one frame part via a seal. The heat exchanger block has a width b1 and a height h1, and the seal has a width $b_2$ and a height $h_2$, where $b_1 \geq b_2$ and $h_1 \geq h_2$.

18 Claims, 6 Drawing Sheets (56) References Cited

U.S. PATENT DOCUMENTS

2014/0190673 A1* 7/2014 Day ..................... F28D 7/1661
                                                            165/168
2015/0083091 A1   3/2015 Fehrenbach et al.
2015/0300754 A1* 10/2015 Vandermeulen ........ B23P 15/26
                                                            165/109.1

FOREIGN PATENT DOCUMENTS

DE      102015220965 A1   4/2017
EP          1912035 A1   4/2008

* cited by examiner

HEAT EXCHANGER

CROSS-REFERENCE TO RELATED APPLICATION

This application claims priority to German Application No. DE 10 2018 216 659.5 filed on Sep. 27, 2018, the contents of which are hereby incorporated by reference in its entirety.

TECHNICAL FIELD

The present invention relates to a heat exchanger, in particular an indirect charge air cooler for an internal combustion engine. The invention furthermore relates to an internal combustion engine with such a heat exchanger, configured as a charge air cooler.

BACKGROUND

Fastenings of plastic boxes on aluminium heat exchangers, for example on charge air coolers or coolant coolers, are embodied for example by a corrugated flanging. Here, a seal is compressed by an air box in a groove of a tube sheet or respectively of a frame for sealing the medium which is to be cooled, for example charge air or coolant.

From DE 10 2015 220 965 A1 a generic heat exchanger with a heat exchanger block with a first channel system for a first fluid is known, wherein this heat exchanger has in addition a second channel system, fluidically separate from the first channel system, for a second fluid. The second channel system is delimited here by two opposite side parts and two opposite end parts.

From DE 10 2012 206 106 A1 an arrangement of a charge air cooler in an intake pipe is known, wherein the charge air cooler has a heat exchanger block which is able to be flowed through by charge air and is able to be inserted through a first opening of the intake pipe into the latter. The heat exchanger block has, moreover, at least a first outer wall and at least a second outer wall, which run along the main extent direction of the heat exchanger block and delimit the region thereof which is able to be flowed through, wherein the intake pipe surrounds the insertable part of the charge air cooler on three sides, so that the heat exchanger block of the charge air cooler is able to be flowed through inside the intake pipe. The intake pipe has, in turn, a first inner surface and a second inner surface, which run respectively along one of the outer walls of the heat exchanger block. Here, provision is made that the first inner surface and/or the second inner surface have respectively a first projection, on which the first outer wall and/or the second outer wall of the heat exchanger block is/are able to be supported. Hereby, it is to be made possible in particular to also be able to mount long charge air coolers in an intake pipe in a simple manner.

A disadvantage in the heat exchangers known from the prior art, however, is that installation space is given up by a frame lying outside a crimp connection, which could be better utilized either for the arrangement of other components for the increase in efficiency by a larger heat exchanger block.

SUMMARY

The present invention is therefore concerned with the problem of indicating, for a heat exchanger of the generic type, an improved or at least an alternative embodiment, which in particular overcomes the disadvantages known from the prior art.

This problem is solved according to the invention by the subject of the independent claim(s). Advantageous embodiments are the subject of the dependent claims.

The present invention is based on the general idea of arranging a sealing connection interface between a heat exchanger block and an air inlet box within a cross-section of the heat exchanger block so that the air inlet box no longer, or only very slightly, projects beyond the external dimensions of the heat exchanger block and thereby this installation space can be used for other components or else for enlarging the heat exchanger block, for example by the provision of one or more further tube rows, whereby the efficiency of the heat exchanger can be increased. The heat exchanger according to the invention, which can be configured for example as an indirect charge air cooler for an internal combustion engine, has the previously mentioned heat exchanger block with a first channel system for a first fluid, for example coolant, and a second channel system, fluidically separate from the first channel system, for a second fluid, for example charge air. The heat exchanger has, furthermore, two opposite side parts and two opposite end parts for the fluidic delimiting of the second channel system, in particular also for defining the second channel system in relation to the first channel system. The heat exchanger block has here a width $b_1$ and a height $h_1$, from which the cross-sectional area $Q_1 = b_1 \times h_1$ can be calculated. The heat exchanger has, in addition, at least one frame part which is connected to a respective edge of the side parts and to a respective edge of the end parts in a force-fitting and/or materially bonded manner, for example pressed via a crimp connection and/or soldered. According to the invention, an air inlet box is now provided, which is connected to the frame part via a seal, wherein the seal is configured as a rectangular ring seal and has a width $b_2$ and a height $h_2$ and therefore has cross-sectional area $Q_2 = b_2 \times h_2$ and wherein $b_1 \geq b_2$ and $h_1 \geq h_2$, so that the seal is maximally as wide and as high as the heat exchanger block. Hereby, it can be achieved that the interface or respectively connection site, lying hitherto outside the cross-sectional area $Q_1$, between the heat exchanger block and the air inlet box, now preferably lies within this cross-sectional area $Q_1$. Hereby, a distinctly smaller installation space requirement can be achieved in the region of the air inlet box, or with an air inlet box of the same size an enlargement of the heat exchanger block, for example by an addition of one or more tube rows, whereby the efficiency of the heat exchanger can be increased. When a smaller air inlet box is used, the installation space thereby available and becoming free is thus available for other components, which is of great advantage in particular in modern and cramped engine compartments.

In an advantageous further development of the solution according to the invention, the frame part has a first mount which faces away from the heat exchanger block and in which an edge of the air inlet box is received. A connection between the edge of the air inlet box and the first mount of the frame part takes place here by the inserting of the seal into the first mount and a pressing, for example by a crimp connection.

In a further advantageous embodiment of the solution according to the invention, the air inlet box has an outwardly projecting first edge portion, which is engaged behind by at least one edge at least of one side part or by the frame part. In this case, the seal is configured as an axial seal.

The first mount on the frame part can have here a deep receiving region and a not so deep receiving region, raised with respect thereto, wherein the axial seal in the installed state is clamped between the first edge portion of the air inlet box and the deep receiving region of the first mount, and wherein the edge of the air inlet box has a second edge portion which is configured as a stop, via which the edge of the air inlet box is able to be supported at the raised receiving region. In this case, an edge of the at least one side part/end part can be mechanically connected with the first edge portion of the air inlet box for example via a crimp connection. Here, the edge of the side part/end part is shaped behind the first edge portion. Provision can also be made here that the edge of the air inlet box rests via its outwardly projecting first edge region on an outer groove wall of the mount, so that the second edge portion actually serves only as a stop.

Alternatively, it is also conceivable here that the first mount has a flat receiving region, wherein the axial seal is clamped between the first edge portion of the air inlet box and the receiving region of the first mount, and wherein the edge of the air inlet box has a second edge portion which is configured as a stop, via which the edge of the air inlet box is able to be supported on the flat receiving region.

In a further advantageous embodiment of the solution according to the invention, the air inlet box likewise has an outwardly projecting first edge portion, but this time with an undercut groove, which faces away from the heat exchanger block in the installed state. The at least one side part/end part has a lug which in the mounted state surrounds the first edge portion of the air inlet box and engages into the undercut groove. In this case, the seal is configured as a radial seal. The first mount of the frame can have here an outer groove wall, a groove base and a curved inner groove wall, wherein the edge of the air inlet box has a second edge portion which is configured in a complementary manner to the groove base and to the inner groove wall and thereby preferably in the installed state lies flat against it. In this case, the seal configured as a radial seal is clamped in the installed state between the outer groove wall and the first and second edge portion of the edge of the air inlet box.

Expediently, the heat exchanger block has tubes, in particular flat tubes, which form the first channel system. Furthermore, two collectors, fluidically separate from the second channel system, are provided, at least one of which has a base part, for example a tube sheet, and a box part, which delimit a collecting chamber of the collector which is fluidically connected with at least one of the tubes. The tubes of the heat exchanger block are held and tightly received here in corresponding passages of the base part. In this case, the heat exchanger block according to the invention is therefore configured as a flat tube heat exchanger. Purely theoretically, it is of course also conceivable that the first channel system is formed by plates which are mounted in the second channel system.

Expediently, the base part and/or the box part form the end part. When therefore the heat exchanger block is configured as a flat tube heat exchanger block with collectors arranged on the longitudinal end side of the flat tubes, these form the end part either as a whole or else the base part or respectively the box part thereof.

Advantageously, provision can be made that the frame part has an edge which is S-shaped in cross-section, which edge has a second mount facing the heat exchanger block, in which the side part or the end part is fixed, in particular soldered. The edge of the side part and/or the edge of the end part is, in addition, bent around and has a double and therefore reinforced edge region, via which it is fixed, in particular soldered, in the second mount. The S-shaped edge can, furthermore, have a free leg facing the air inlet box, via which the air inlet box is fixed to the frame part, which in addition at its free end can be bent slightly outwards in order to facilitate an introduction of the edge of the air inlet box.

The present invention is based further on the general idea of equipping an internal combustion engine with such a heat exchanger, configured as a charge air cooler, and thereby to transfer to the internal combustion engine or respectively to a vehicle receiving this internal combustion engine, the advantages which apply to the heat exchanger, in particular with regard to the efficiency or respectively the necessary installation space requirement.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar of functionally identical components.

BRIEF DESCRIPTION OF THE DRAWINGS

There are shown here, respectively diagrammatically.

DETAILED DESCRIPTION

According to FIGS. 5 to 7, 12e and 13 and 17, a heat exchanger 1 according to the invention, which can be configured for example as a charge air cooler or as a coolant cooler, configured in the present case as a charge air cooler, has a heat exchanger block 2 with a first channel system 3 for a first fluid, coolant for example, and a second channel system 4, fluidically separate from the first channel system 3, for a second fluid, charge air or air for example. Two opposite side parts 5 and two opposite end parts 6 are also provided for the fluidic delimiting of the second channel system 4. The heat exchanger block 2 has here a width $b_1$ and a height $h_1$. Resulting herefrom is a cross-sectional area $Q_1$ of the heat exchanger block 2 with $Q_1=b_1 \times h_1$.

Figure 14:
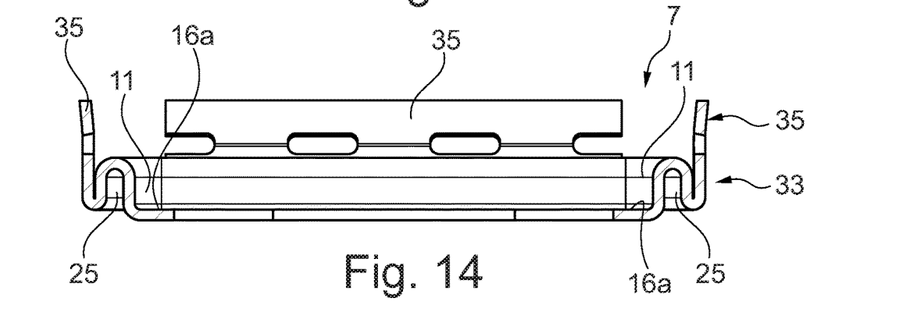
Figure 15:
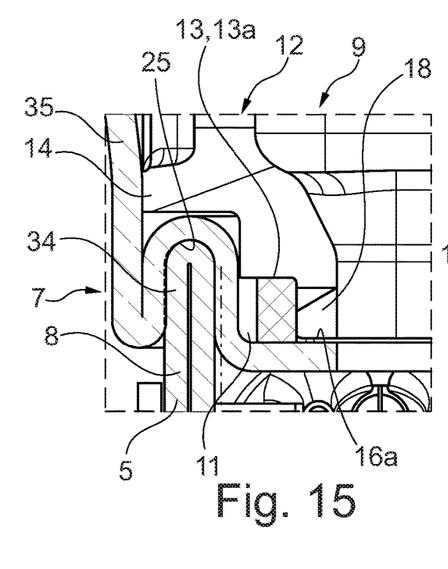
Figure 16:
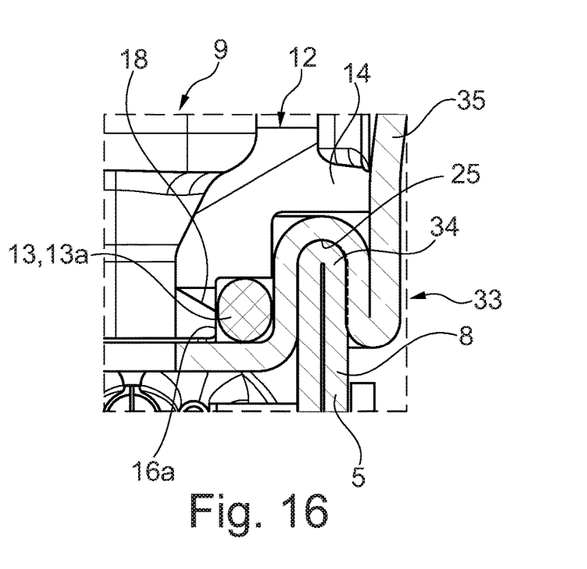
Figure 17:
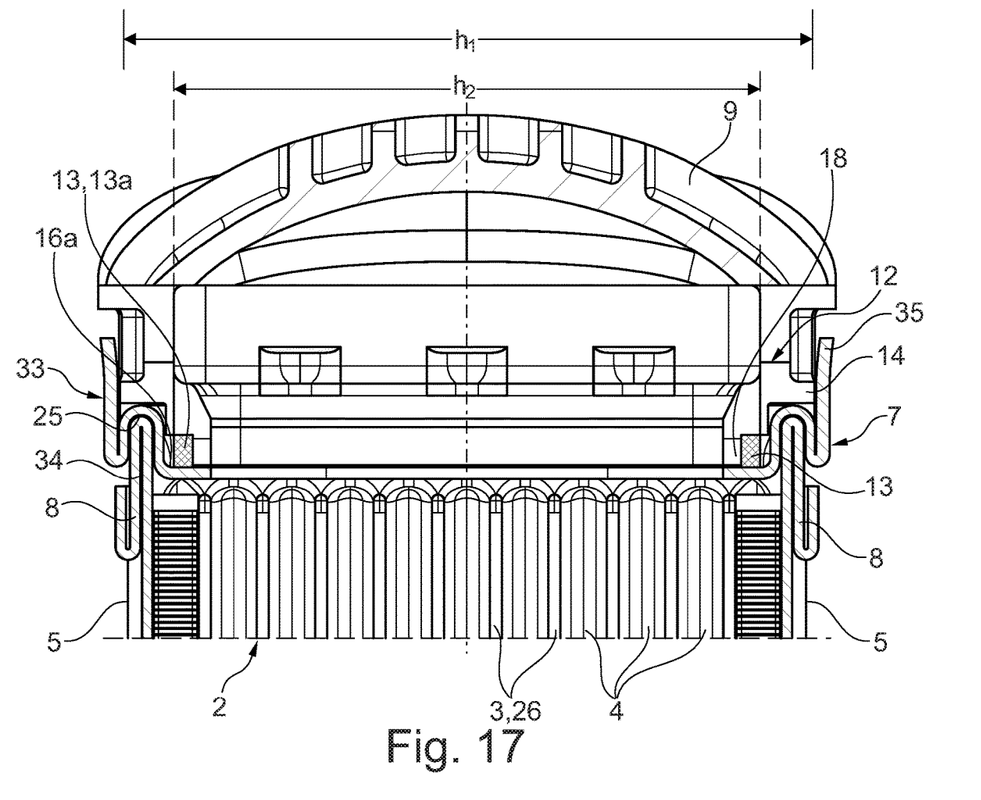

Furthermore, the heat exchanger 1 according to the invention has at least one frame part 7 (cf. also FIG. 14), which is connected to a respective edge 8 of the side parts 5 and to a respective edge of the end parts 6 in a force-fitting and/or materially bonded manner. An air inlet box 9 is arranged on the frame part 7 and is connected in a fluid-transmitting manner with the second channel system 4, wherein the air inlet box 9 is connected to the frame part 7 via a seal 13, wherein the seal 13 is configured as a ring seal which is rectangular or round in cross-section and has a width $b_2$ and a height $h_2$, so that a cross-sectional area $Q_2=b_2 \times h_2$ results herefrom. According to the invention here $b_1 \geq b_2$ and $h_1 \geq h_2$, so that the seal 13 is maximally as wide and as high as the heat exchanger block 2. Hereby, it can be achieved that the air inlet box 9 projects distinctly less far beyond the heat exchanger block 2 than in the case of heat exchangers 1' of the prior art, and in particular even remains within the cross-sectional area of the heat exchanger block 2 (cf. in particular FIGS. 5 to 8).

Observing the heat exchanger 1', known from the prior art, according to FIGS. 1 to 4, the proportions are thus entirely the other way round, so that the height $h_2$ of the seal 13' is greater than the height $h_1$ of the heat exchanger block 2', whereby an interface between the air inlet box 9' and the heat exchanger block 2', in particular its side parts 5', lies outside the cross-section $Q_1$ of the heat exchanger block 2'. This can be clearly seen in particular from FIGS. 1 and 3 and 4.

In FIGS. 1 to 4, the respective components of the heat exchanger 1', known from the prior art, are designated with the same reference numbers, but additionally with an apostrophe, in order to be able to clearly distinguish between the heat exchanger 1' of the prior art and the heat exchanger 1 according to the invention.

Figure 1:
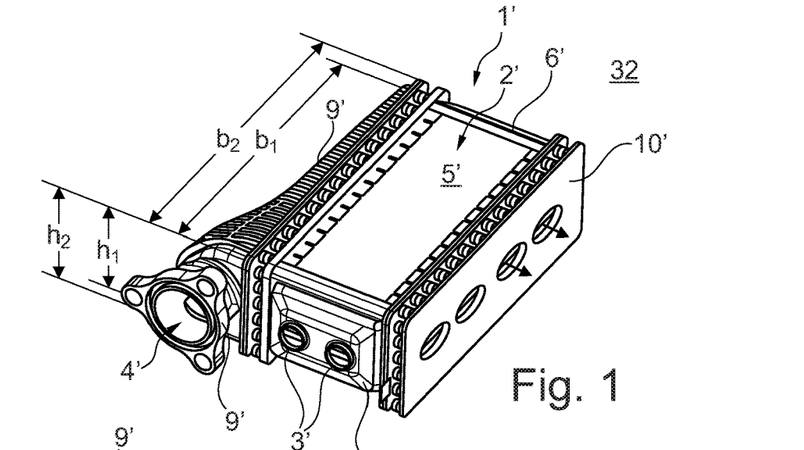
FIG. 1 a heat exchanger in a view according to the prior art.
Figure 2:
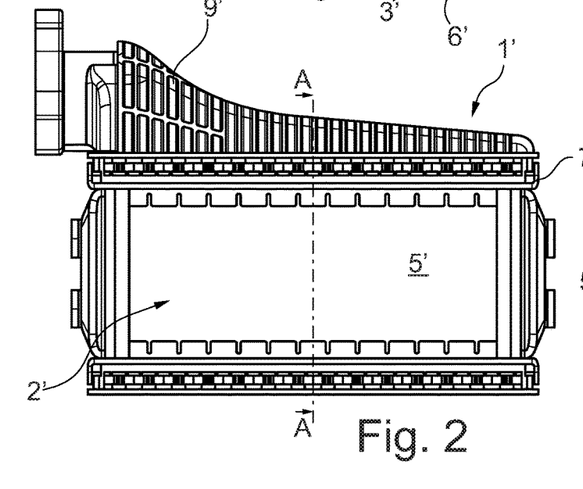
FIG. 2 a side view onto the heat exchanger shown according to FIG. 1 according to the prior art, FIG. 3 a sectional illustration through the heat exchanger according to the prior art along the section plane A-A, FIG. 4 a detail illustration of FIG. 3, FIG. 5 a view onto a heat exchanger according to the invention, FIG. 6 a side view onto the heat exchanger according to the invention, FIG. 7 a sectional illustration along the section plane B-B, FIG. 8 a detail illustration of FIG. 7, FIG. 9 a detail illustration of FIG. 8, FIG. 10 a detail illustration as in FIG. 9, but not with an axial seal, but rather with a radial seal, FIGS. 11A to 11C different method steps for production a heat exchanger according to the invention with tubes in the heat exchanger block, FIGS. 12A to 12E individual method steps for producing a heat exchanger according to the invention with a heat exchanger block having plates, FIG. 13 a side view onto a heat exchanger according to the invention, FIG. 14 a sectional illustration through a frame part, FIG. 15 a sectional illustration in a connection region of an air inlet box with a frame part and with a side part using a seal which is rectangular in cross-section, FIG. 16 a sectional illustration analogous to FIG. 15, but using a seal which is round in cross-section, FIG. 17 a partial section illustration along the section plane A-A of FIG. 13, FIG. 18 an illustration as in FIG. 16, but with dimensioning, FIG. 19 an illustration as in FIG. 15, but with dimensioning.
Figure 3:
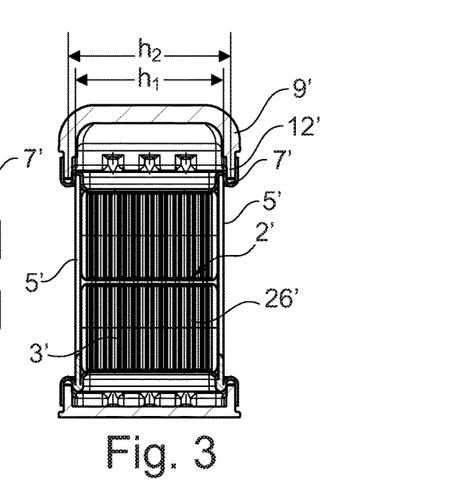
Figure 4:
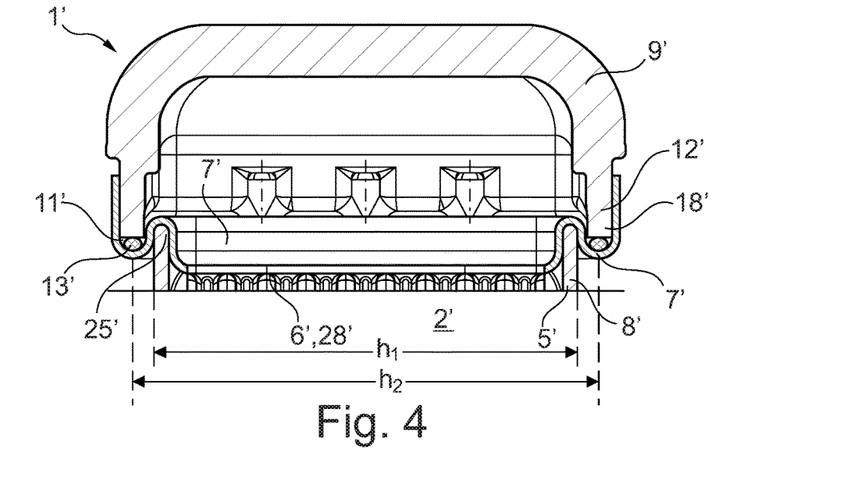
Figure 5:
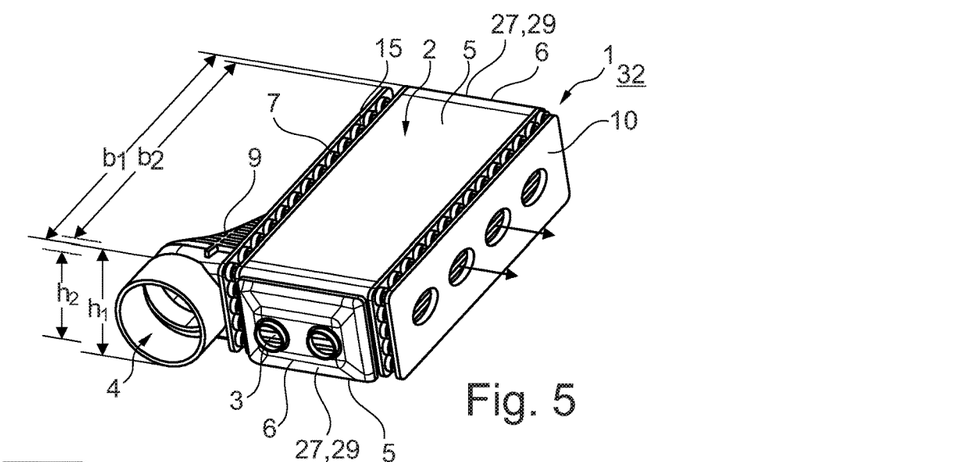
Figure 6:
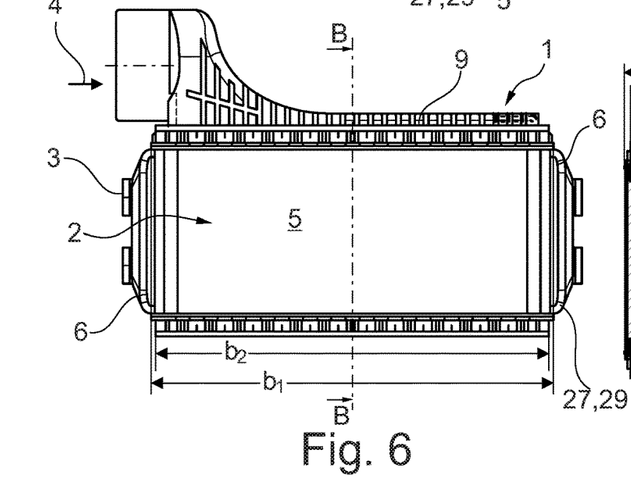
Figure 7:
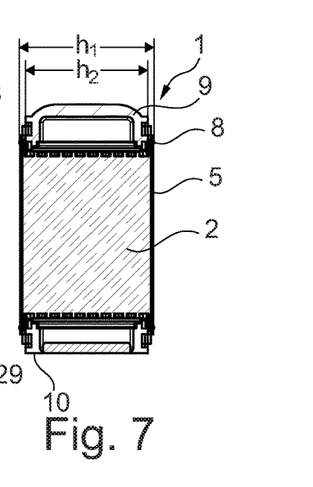
Figure 8:
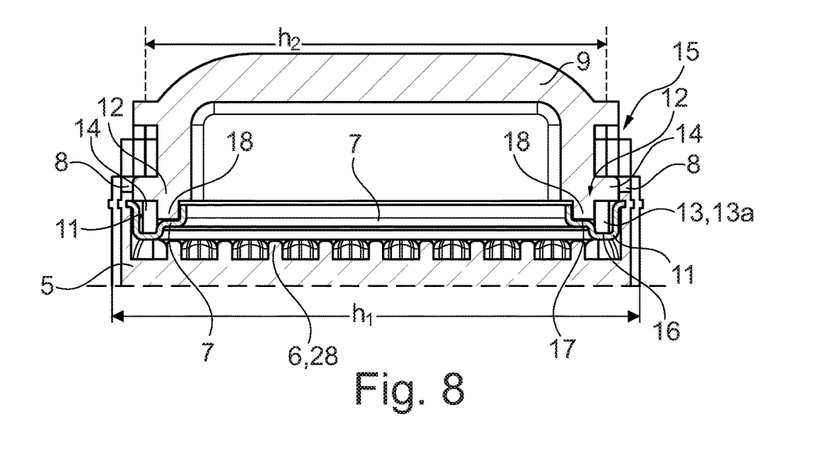

By comparison, the heat exchanger 1 according to the invention in accordance with FIGS. 5 and 7 and 8 behaves entirely differently, because here a connection site lies between the air inlet box 9 and the heat exchanger block 2 preferably within the cross-sectional area $Q_1$ of the heat exchanger block 2. Hereby, installation space can be saved in the region of the air inlet box 9 or on the opposite side in the region of a flange 10, or else the heat exchanger block 2 can be configured higher with regard to its height $h_1$ and thereby for example can have more tubes 26 for the heat exchange, whereby its efficiency can be increased.

Figure 9:
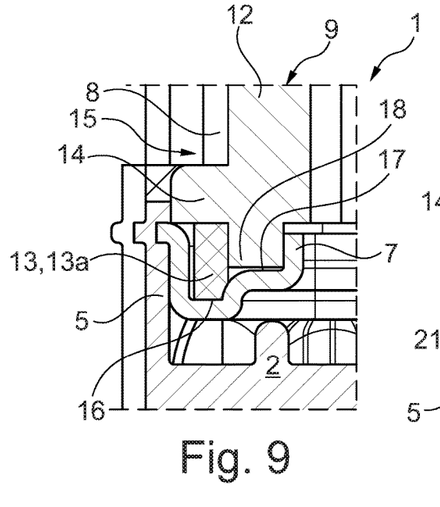
Figure 10:
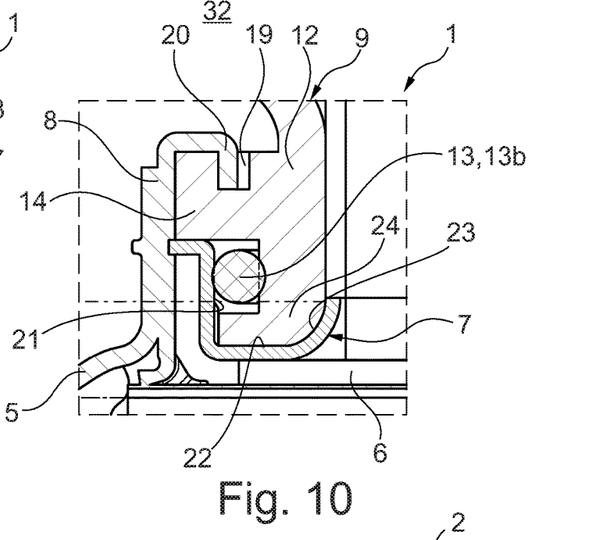

Observing FIGS. 8 to 10 more closely, it can be seen that the frame part 7 has a first mount 11, in which an edge 12 of the air inlet box 9 is received. This first mount 11 lies here in the heat exchanger 1' known from the prior art according to FIG. 4 outside the heat exchanger block 2', whereas in the heat exchanger 1 according to the invention in accordance with FIGS. 5 to 12 it lies within the heat exchanger block 2, so that the seal 13 in this case has a smaller height $h_2$ than the heat exchanger block 2 with its height $h_1$ and thereby the air inlet box 9 in this case has a smaller height than the heat exchanger block 2. In the first mount 11, the seal 13 is arranged here, which brings about a sealing of the second channel system 4 with respect to the environment.

In FIGS. 9 and 10 two different seal designs of the heat exchanger 1 according to the invention are now described.

According to FIG. 9, the air inlet box 9 has an outwardly projecting first edge portion 14, which is engaged behind by at least one edge 8 of the at least one side part 5. The engaging behind of the edge 8 of the side part 5 is brought about here via a crimp connection 15. In this case, the seal 13 is configured as an axial seal 13a. The first mount 11 has a deep receiving region 16 and a receiving region 17 which is raised with respect thereto, wherein the axial seal 13a is clamped between the first edge portion 14 of the air inlet box 9 and the deep receiving region 16 of the first mount 11, and wherein the edge 12 of the air inlet box 9 has a second edge portion 18, which is configured as a stop and can be supported via the edge 12 of the air inlet box 9 at the raised receiving region 17. In the same way or alternatively hereto, a support of the second edge portion 14 can of course also take place on an outer edge of the first mount 11.

If one observes in this respect the embodiment according to FIG. 10, the air inlet box 8 thus also has here an outwardly projecting first edge portion 14 which, however, unlike the first edge portion 14 according to FIG. 9, has an undercut groove 19. At least one side part 5 or respectively at least one end part 6 has here a lug 20, which in the mounted state surrounds the first edge portion 14 of the air inlet box 9 and at the same time engages into the undercut groove 19. The seal 13 is configured here as a radial seal 13b. The first mount 11 has, in addition, an outer groove wall 21, a groove base 22 and a curved inner groove wall 23, wherein the edge 12 of the air inlet box 9 has a second edge portion 24, which is configured in a complementary manner to the groove base 22 and to the inner curved groove wall 23. In this case, the seal 13, configured as radial seal 13b, is therefore clamped in the installed state between the outer groove wall 21 and the first and second edge portion 14, 24 of the edge 12 of the air inlet box 9.

The frame part 7 can be pressed with the respective edge 8 of the side parts 5 and with a respective edge of the end parts 6, and soldered, wherein the edges 8 are received either as for example in FIG. 4, 13-19 in a second mount 25, or lie externally on the edge 12 of the air inlet box 9 at least in certain areas (cf. FIG. 5-12).

The heat exchanger block 2 of the heat exchanger 1 according to the invention can have for example tubes 26, in particular flat tubes, which form the first channel system 3. Furthermore, two collectors 27, fluidically separate from the second channel system 4, are provided, at least one of which collectors has a base part 28 and a box part 29, which delimit a collecting chamber of the collector 27 which is fluidically connected with at least one of the tubes 26. The base part 28 and/or the box part 29 can form the end part 6 here. In the second channel system 4, furthermore heat exchanger elements 30, for example rib structures, can be arranged, which are in heat-transmitting contact with at least one of the tubes 26 and thereby improve the heat exchange.

Figure 11:
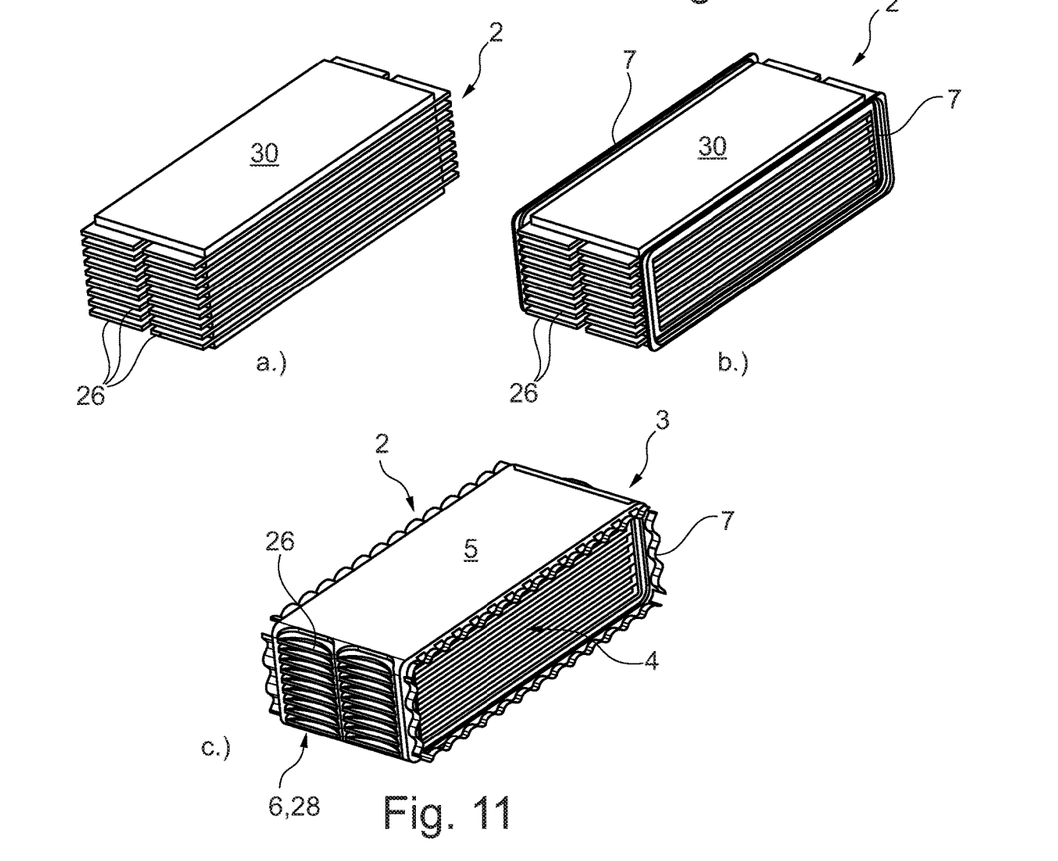

Such a heat exchanger 1, having tubes 26, is shown with regard to production for example in the method steps 11a to 11c, wherein according to FIG. 11 a firstly the individual tubes 26, for example flat tubes, with corresponding heat exchanger elements 30, for example corresponding rib structures. According to FIG. 11b, the frame parts 7 are then arranged laterally, after which according to the method step in FIG. 11c the end parts 6 and the side parts 5 are arranged. In this case, the end part 6 is configured as a base part 28, wherein the side part 5 is connected with its edge 8 and the end part 6, i.e. here the base part 28, is connected by its edge with the frame part 7. In the following step, the joining with the air inlet box 9 or respectively with the flange 10 takes place.

Figure 12:
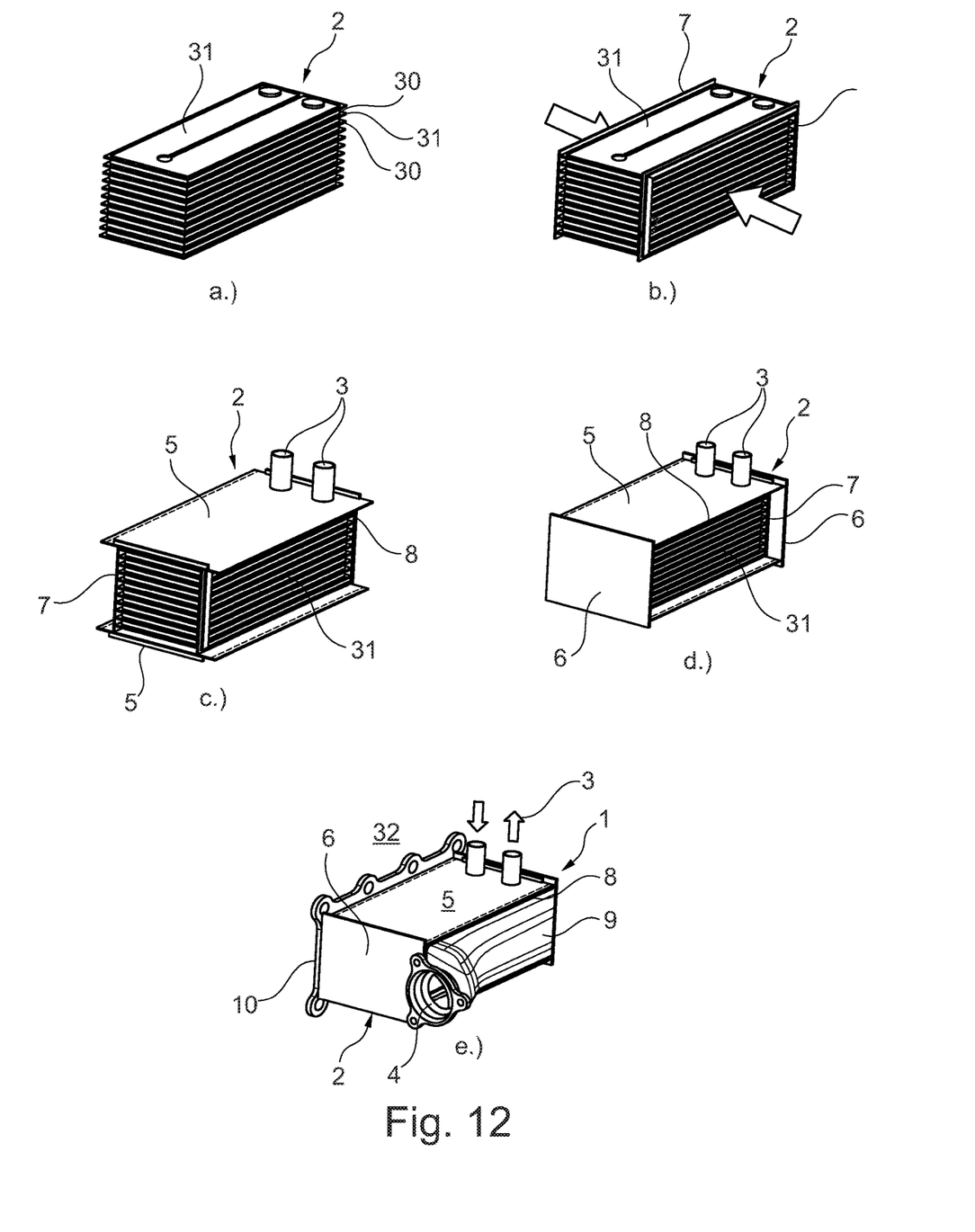
Figure 13:
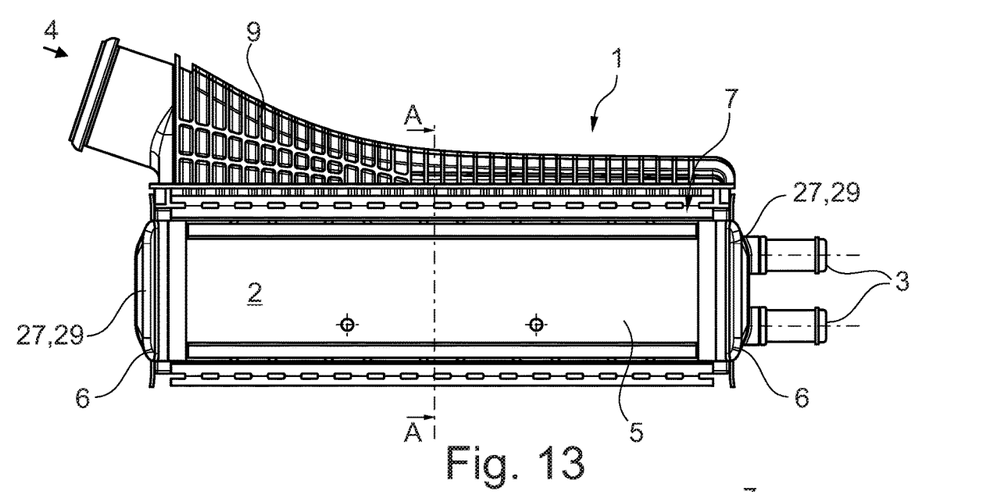

According to FIG. 12, the individual method steps for the production of a heat exchanger 1 according to the invention are shown in an embodiment of the heat exchanger block 2 with plates 31 and with heat exchanger elements 30 arranged therebetween. According to FIG. 12a, firstly the heat exchanger block 2 with plates 31 and heat exchanger elements 30, for example corrugated ribs, is stacked, after which in the method step 12b the frame parts 7 are put on. Subsequently, the side parts 5 according to the method step 12c and the end parts 6 according to the method step 12d are put on. In the last method step 12e, the air inlet box 9 and the flange 10 is now connected with the side parts 5 or respectively the end parts 6, wherein it can also be seen here that the height of the air inlet box 9 is smaller than the height $h_1$ of the heat exchanger block 2.

Observing 13-19, it can be seen that the first mount 11 has a flat receiving region 16a, wherein the axial seal 13a is clamped between the first edge portion 14 of the air inlet box 9 and the receiving region 16a of the first mount 11, and wherein the edge 12 of the air inlet box 9 has a second edge portion 18, which is configured as a stop via which the edge 12 of the air inlet box 9 is able to be supported on the flat receiving region 16a.

According to FIGS. 13 to 19, it can be further seen that the frame part 7 has an edge 33 which is S-shaped in cross-section. The S-shaped edge 33 has a second mount 25, facing the heat exchanger block 2, in which mount the side part 5 or the end part 6 is fixed, in particular soldered. The edge 8 of the side part 5 and/or the edge of the end part 6 is, in addition, bent around and has a double edge region 34, via which it is fixed in the second mount 25, in particular pressed and/or soldered. Via the double edge region 34 with double wall thickness, a particularly rigid and resilient connection can be created.

The S-shaped edge 33 on the frame part 7 has in addition a free leg 35, facing the air inlet box 9, via which the air inlet box 9 is fixed on the frame part 7. As a whole, the frame part 7 has four legs 35, which are bent slightly outwards at their free end in order to facilitate an introduction of the edge 12 of the air inlet box 9.

Figure 18:
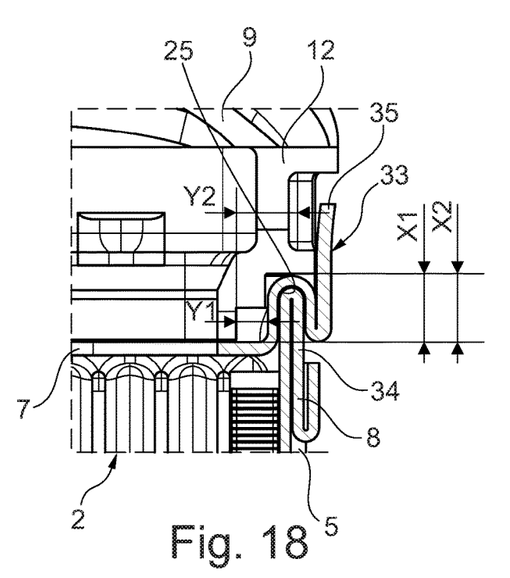
Figure 19:
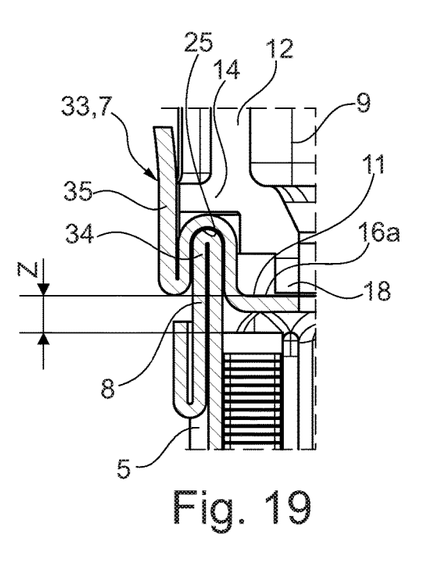

Observing FIGS. 18 and 19, example dimensions X1, X2, Y1, Y2 and Z can be seen there, wherein by way of example the following measurements can be assumed: X1=3 mm, X2=6.3 mm, Y1=2.9 mm and Y2=5.4 mm. A further important measurement is the distance Z between the frame part 7 and the heat exchanger block 2, wherein the following is to apply: Z<10 mm, in order to prevent a breaking of the side part 5 under compressive stress.

All the embodiments of the heat exchanger 1 according to the invention have in common here that a cross-sectional area $Q_2$ of the seal 13 and thereby also of the air inlet box 9 is smaller or maximally as great as a cross-sectional area $Q_1$ of the heat exchanger block 2. Hereby, installation space can be saved in particular in the region of the air inlet box 9, or with the use of an air inlet box 9 of the same size, a size of the heat exchanger block 2 can be increased and thereby the efficiency of the heat exchanger 1 can be increased. Such a heat exchanger 1 is usually used in the field of an internal combustion engine 32.

The invention claimed is:

1. A heat exchanger for an internal combustion engine, comprising:
    a heat exchanger block including a first channel system for a first fluid and a second channel system, fluidically separate from the first channel system, for a second fluid,
    two opposite side parts and two opposite end parts, structured and arranged to fluidically delimit the second channel system,
    wherein the heat exchanger block has a width b1 and a height h1,
    at least one frame part, the at least one frame part connected in at least one of a force-fitting manner and a materially bonded manner with a respective edge of the two side parts and with a respective edge of the two end parts, and
    an air inlet box connected to the at least one frame part via a seal, wherein the seal is configured as a rectangular ring seal and has a width $b_2$ and a height $h_2$, and wherein $b_1 \geq b_2$ and $h_1 \geq h_2$, so that the seal is maximally as wide and as high as the heat exchanger block,
    wherein the at least one frame part has a first mount structured and arranged to receive an edge of the air inlet box, and the seal is arranged in the first mount, and
    wherein the air inlet box has an outwardly projecting first edge portion that is engaged from behind by the respective edge of at least one of the two side parts or by the frame part, and the seal is further configured as an axial seal.

2. The heat exchanger according to claim 1, wherein one of:
    the first mount has a deep receiving region and a raised receiving region relative to the deep receiving region, wherein the seal configured as the axial seal is clamped between the first edge portion of the air inlet box and the deep receiving region of the first mount, and wherein the edge of the air inlet box has a second edge portion structured as a stop that supports the edge of the air inlet box on the raised receiving region, and
    the first mount has a flat receiving region, wherein the seal configured as the axial seal is clamped between the first edge portion of the air inlet box and the flat receiving region of the first mount, and wherein the edge of the air inlet box has a second edge portion structured as a stop that supports the edge of the air inlet box on the flat receiving region.

3. The heat exchanger according to claim 1, wherein the frame part has an edge that is S-shaped in cross-section.

4. The heat exchanger according to claim 3, wherein the edge has a second mount facing the heat exchanger block, and wherein a respective one of the two side parts or a respective one of the two end parts is fixed in the second mount.

5. The heat exchanger according to claim 4, wherein the respective edge of at least one of the respective side part and the respective edge of the respective end part is bent around and has a double edge region that is fixed in the second mount.

6. The heat exchanger according to claim 3, wherein the edge has a free leg facing the air inlet box, and wherein the air inlet box is fixed to the at least one frame part via the free leg.

7. A heat exchanger for an internal combustion engine, comprising:
- a heat exchanger block including a first channel system for a first fluid and a second channel system, fluidically separate from the first channel system, for a second fluid,
- two opposite side parts and two opposite end parts, structured and arranged to fluidically delimit the second channel system,
- wherein the heat exchanger block has a width b1 and a height h1,
- at least one frame part, the at least one frame part connected in at least one of a force-fitting manner and a materially bonded manner with a respective edge of the two side parts and with a respective edge of the two end parts,
- an air inlet box connected to the at least one frame part via a seal, wherein the seal is configured as a rectangular ring seal and has a width $b_2$ and a height $h_2$, and wherein $b_1 \geq b_2$ and $h_1 \geq h_2$, so that the seal is maximally as wide and as high as the heat exchanger block,
- wherein one of:
  - the heat exchanger block includes a plurality of tubes that define the first channel system, and two collectors are provided fluidically separate from the second channel system, and wherein at least one of the two collectors includes a base part and a box part together delimiting a collecting chamber fluidically connected to at least one of the plurality of tubes, and
  - the heat exchanger block includes a plurality of plates that define the first channel system.

8. The heat exchanger according to claim 7, wherein the at least one frame part has a first mount structured and arranged to receive an edge of the air inlet box.

9. The heat exchanger according to claim 8, wherein the seal is arranged in the first mount.

10. The heat exchanger according to claim 9, wherein:
- the air inlet box has an outwardly projecting first edge portion with an undercut groove,
- at least one of a respective side part of the two side parts and a respective end part of the two end parts has a lug that surrounds the first edge portion of the air inlet box and engages into the undercut groove in a mounted state,
- the seal is further configured as a radial seal,
- the first mount has an outer groove wall, a groove base and a curved inner groove wall, and
- the air inlet box has a second edge portion provided on the edge, the second edge portion structured and arranged complementary to the groove base and to the inner groove wall of the first mount.

11. The heat exchanger according to claim 10, wherein the seal configured as the radial seal is clamped in the mounted state between the outer groove wall and the first edge portion and the second edge portion.

12. The heat exchanger according to claim 7, wherein the heat exchanger block includes the plurality of tubes, and wherein at least one of:
- at least one of the base part and the box part define at least one of the two end parts, and
- the second channel system includes a plurality of heat exchanger elements arranged therein, and wherein the plurality of heat exchanger elements are in heat-transmitting contact with at least one of the plurality of tubes.

13. The heat exchanger according to claim 12, wherein the plurality of heat transfer elements comprise ribs.

14. An internal combustion engine, comprising:
- a heat exchanger configured as a charge air cooler, the heat exchanger including:
  - a heat exchanger block including a first channel system for a first fluid and a second channel system for a second fluid, the second channel system fluidically separate from the first channel system;
  - two opposite side parts and two opposite end parts, structured and arranged to fluidically delimit the second channel system;
  - at least one frame part connected in at least one of a force-fitting manner and a materially bonded manner with a respective edge of the two side parts and with a respective edge of the two end parts;
  - an air inlet box connected to the at least one frame part via a seal;
  - wherein the heat exchanger block has a width b1 and a height h1;
  - wherein the seal is configured as a rectangular ring seal and has a width $b_2$ and a height $h_2$, and wherein $b_1 \geq b_2$ and $h_1 \geq h_2$, so that the seal is maximally as wide and as high as the heat exchanger block; and
  - wherein the at least one frame part has a first mount structured and arranged to receive an edge of the air inlet box, and an S-shaped edge providing a second mount facing the heat exchanger block.

15. The internal combustion engine according to claim 14, wherein the seal is arranged in the first mount.

16. The internal combustion engine according to claim 15, wherein the air inlet box has an outwardly projecting first edge portion that is engaged from behind by the respective edge of at least one of the two side parts or by the frame part; and
wherein the seal is further configured as an axial seal.

17. The internal combustion engine according to claim 16, wherein the first mount has a deep receiving region and a raised receiving region relative to the deep receiving region, wherein the seal configured as the axial seal is clamped between the first edge portion of the air inlet box and the deep receiving region of the first mount, and wherein the edge of the air inlet box has a second edge portion structured as a stop that supports the edge of the air inlet box on the raised receiving region.

18. The internal combustion engine according to claim 16, wherein the first mount has a flat receiving region, wherein the seal configured as the axial seal is clamped between the first edge portion of the air inlet box and the flat receiving region of the first mount, and wherein the edge of the air inlet box has a second edge portion structured as a stop that supports the edge of the air inlet box on the flat receiving region.

* * * * *